United States Patent
Marinov et al.

(10) Patent No.: US 11,822,676 B2
(45) Date of Patent: Nov. 21, 2023

(54) DETERMINATION OF A MINIMAL SET OF PRIVILEGES TO EXECUTE A WORKFLOW IN A VIRTUALIZED COMPUTING ENVIRONMENT

(71) Applicant: VMware, Inc., Palo Alto, CA (US)

(72) Inventors: Martin Marinov, Sofia (BG); Branislav Abadzhimarinov, Sofia (BG); Miroslava Dimitrova Markova, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 1053 days.

(21) Appl. No.: 16/451,030

(22) Filed: Jun. 25, 2019

(65) Prior Publication Data
US 2020/0410115 A1 Dec. 31, 2020

(51) Int. Cl.
*G06F 21/60* (2013.01)
*G06F 9/54* (2006.01)
*G06F 9/455* (2018.01)

(52) U.S. Cl.
CPC ........ *G06F 21/604* (2013.01); *G06F 9/45558* (2013.01); *G06F 9/54* (2013.01); *G06F 2009/45587* (2013.01); *G06F 2221/2141* (2013.01)

(58) Field of Classification Search
CPC ...... G06F 21/604; G06F 9/45558; G06F 9/54; G06F 2009/45587; G06F 2221/2141
See application file for complete search history.

(56) References Cited

U.S. PATENT DOCUMENTS

| | | | | |
|---|---|---|---|---|
| 9,531,805 | B1* | 12/2016 | Brown | H04L 67/10 |
| 10,148,701 | B1* | 12/2018 | Hecht | G06F 9/455 |
| 2008/0209451 | A1* | 8/2008 | Michels | G06F 15/16 719/328 |
| 2009/0328180 | A1* | 12/2009 | Coles | G06F 9/468 726/9 |
| 2015/0235043 | A1* | 8/2015 | Haik | H04W 4/60 726/27 |
| 2015/0379101 | A1* | 12/2015 | Dowlatkhah | G06F 11/1451 707/624 |
| 2016/0306963 | A1* | 10/2016 | Austin | G06F 21/53 |
| 2016/0335454 | A1* | 11/2016 | Choe | G06Q 30/018 |
| 2018/0027006 | A1* | 1/2018 | Zimmermann | G06F 21/6218 726/11 |
| 2018/0202686 | A1* | 7/2018 | Ahuja | F24F 11/62 |

(Continued)

FOREIGN PATENT DOCUMENTS

KR 20180047467 A * 5/2018

*Primary Examiner* — Lynn D Feild
*Assistant Examiner* — Abdullah Almamun
(74) *Attorney, Agent, or Firm* — SU IP CONSULTING

(57) ABSTRACT

Example methods are provided to for automated determination of a minimal set of privileges that are required to execute a workflow in a virtualized computing environment. While the workflow is being executed, interactions with a user interface are recorded. The interactions include application program interface (API) calls. The method identifies the privileges that are used to execute the API calls, and the identified privileges are combined to form the minimal set of privileges. A model is generated that associates the minimal set of privileges to the workflow, and the model is applied to determine the privileges to assign to users that will be performing the same workflow.

21 Claims, 5 Drawing Sheets

(56) References Cited

U.S. PATENT DOCUMENTS

| | | | |
|---|---|---|---|
| 2018/0218167 A1* | 8/2018 | Narayanaswamy | ........................ H04L 63/0435 |
| 2018/0285365 A1* | 10/2018 | Morey | ...................... G06F 8/36 |
| 2019/0138715 A1* | 5/2019 | Shukla | .................... G06F 21/54 |
| 2019/0180036 A1* | 6/2019 | Shukla | ................ G06F 11/3604 |
| 2020/0004829 A1* | 1/2020 | Denton | ................ G06F 16/437 |
| 2020/0151617 A1* | 5/2020 | Chauhan | ................ G06N 20/00 |

\* cited by examiner

DETERMINATION OF A MINIMAL SET OF PRIVILEGES TO EXECUTE A WORKFLOW IN A VIRTUALIZED COMPUTING ENVIRONMENT

BACKGROUND

Unless otherwise indicated herein, the approaches described in this section are not admitted to be prior art by inclusion in this section.

In a computing environment, system architects often face the problem of determining which privileges to give to system administrators and other information technology (IT) staff in their organization. Typically, privileges are assigned to an IT staff member or other user based on the types of workflows or other tasks that the IT staff member is to perform. Furthermore, the assignment of privileges usually follows the principle of "least privilege" or "minimal privilege," which dictates that each user in the computing environment be given only those privileges that are essential to perform the workflows assigned to that user.

For example, if a user's primary role is to monitor for network outages in the computing environment, then the user may be given access rights to only the information and other resources/objects that are necessary for performing tasks related to monitoring for network outages, such as access rights associated with using diagnostic tools. That user would typically not be given other privileges that are unrelated or less-related to monitoring for network outages, such as privileges to access employee salary and benefit information contained in a human resources (HR) department's database for that user's organization. Adhering to the principle of "minimal privilege" helps to ensure security and integrity in the computing environment.

However, current methods to determine a minimal set of privileges for a workflow typically involve a manual process performed by a system architect to review documentation and also involve some amount of guesswork. Such methods are inefficient and sometimes yield inaccurate or incomplete assignments of privileges, which often result in a user contacting a system administrator (who has greater IT administrative/management privileges) to convey something to the effect of "The system is not letting me access resource X, which I need to perfom task Y. Can you please update my user profile to give me the privilege(s) to access resource X?"

SUMMARY

According to one aspect, a method is provided to determine a minimal set of privileges to execute a workflow in a virtualized computing environment. The method includes capturing application program interface (API) calls that are made while executing the workflow on a user interface in the virtualized computing environment; identifying privileges that correspond to the captured API calls; and combining the identified privileges to form the minimal set of privileges.

According to another aspect, a non-transitory computer-readable medium has instructions stored thereon, which in response to execution by one or more processors, cause the one or more processors to perform or control performance of operations to determine a minimal set of privileges to execute a workflow in a virtualized computing environment. The operations include: capturing application program interface (API) calls that are made while executing the workflow on a user interface in the virtualized computing environment; identifying privileges that correspond to the captured API calls; and combining the identified privileges to form the minimal set of privileges.

According to still another aspect, an apparatus is provided to determine a minimal set of privileges to execute a workflow in a virtualized computing environment. The apparatus includes: a display screen configured to present a user interface in the virtualized computing environment; an application program interface (API) converter configured to capture API calls that are made while executing the workflow on the user interface; and a processor coupled to the API converter and configured to: identify privileges that correspond to the captured API calls; and combine the identified privileges to form the minimal set of privileges.

DETAILED DESCRIPTION

Figure 1:
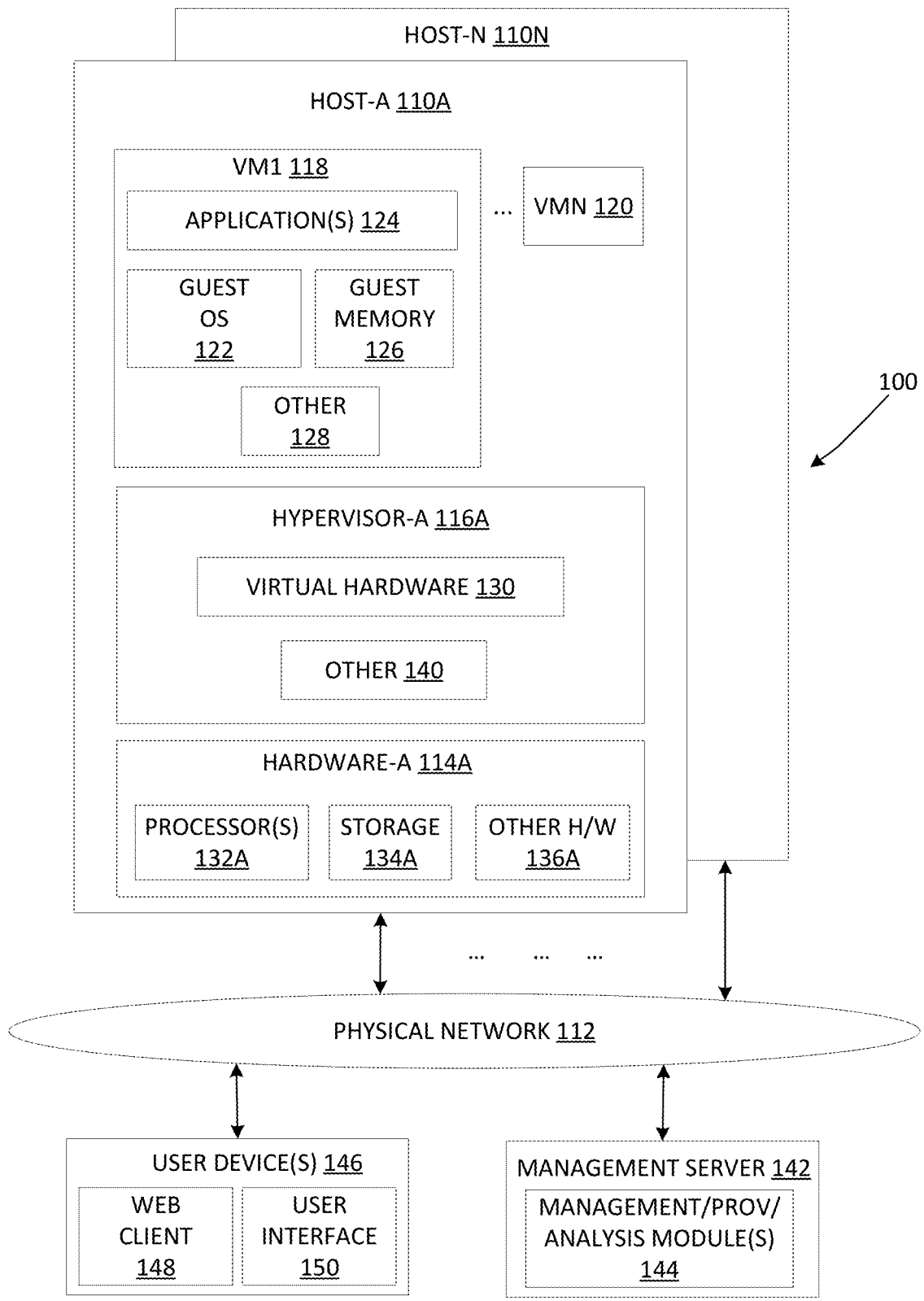
FIG. 1 is a schematic diagram illustrating an example virtualized computing environment that can implement automated determination of privileges to execute a workflow.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks associated with determining a minimal set of privileges, by providing a method that identifies privileges from application program interface (API) calls. For example, a user may execute a workflow for performing a task. The workflow may include multiple API calls. During the course of executing the workflow, the interactions involved in the workflow are recorded, and the API calls executed during the workflow are identified. Privileges are required when the API calls are made. Each of the API calls include corresponding API metadata that identify which privilege(s) is/are being required by the API call and the object (such as data or other resource) that the API call is directed towards. The identified privileges can be collected and placed into a model, for later use when a set of minimal privileges needs to be determined for any other user that will be performing the same or similar workflow.

Computing Environment

The technology described herein may be implemented in a virtualized computing environment in some embodiments. Virtualization allows the abstraction and pooling of hardware resources to support virtual machines in a virtualized computing environment, such as a software-defined datacenter (SDDC). For example, through server virtualization, virtual machines running different operating systems may be supported by the same physical machine (e.g., referred to as a "host"). Each virtual machine may be generally provisioned with virtual resources to run an operating system and applications. The virtual resources may include central processing unit (CPU) resources, memory resources, storage resources, network resources, etc.

Various implementations will now be explained in more detail using FIG. 1, which is a schematic diagram illustrating an example virtualized computing environment 100 that can implement automated determination of a minimal set of privileges to execute a workflow. Depending on the desired implementation, virtualized computing environment 100 may include additional and/or alternative components than that shown in FIG. 1.

Generally speaking, a workflow in the virtualized computing environment 100 can involve a set of actions, which can be sequential or out-of-order or branching etc., that are performed in order to initiate and complete a task. For example, the task may involve the configuration of certain subsystems/devices/elements in the virtualized computing environment 100. Other example tasks can involve troubleshooting, maintenance, provisioning, monitoring, and various other tasks that pertain to the management or use of the various subsystems/devices/elements in the virtualized computing environment 100. The workflows can be performed by a system administrator, other IT staff member, or any other user (e.g., human or machine or software entities) or combination thereof in the virtualized computing environment 100.

In the example in FIG. 1, the virtualized computing environment 100 includes multiple hosts, such as host-A 110A . . . host-N 110N that may be inter-connected via a physical network 112. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other host-N 110N can include substantially similar components and features.

The host-A 110A includes suitable hardware-A 114A and virtualization software (e.g., hypervisor-A 116A) to support various virtual machines (VMs). For example, the host-A 110A supports VM1 118 . . . VMN 120. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 is shown and described herein.

VM1 118 may include a guest operating system (OS) 122 and one or more guest applications 124 (and their corresponding processes) that run on top of the guest operating system 122. VM1 118 may also include a guest memory 126 for use by the guest operating system 122 and/or for other storage purposes. VM1 118 may include still further other elements, generally depicted at 128, such as a virtual disk and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs. The hypervisor-A 116A may include still further elements 140 to support operation of the hypervisor-A 116A and its associated VMs.

Hardware-A 114A in turn includes suitable physical components, such as CPU(s) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the applications 124 (e.g., Microsoft Word, Microsoft Excel, etc.) in VM1 118. Corresponding to the hardware-A 114A, the virtual hardware 130 may include a virtual CPU, a virtual memory, a virtual disk, a virtual network interface controller (VNIC), etc.

A management server 142 of one embodiment can take the form of a physical computer with functionality to manage or otherwise control the operation of host-A 110A . . . host-N 110N. The management server 142 may be operable to collect usage data associated with the hosts and VMs, to configure and provision VMs, to activate or shut down VMs, to monitor and remedy network problems or other operational issues, and to perform other managerial tasks associated with the operation and use of the various elements in the virtualized computing environment 100. The management server 142 may be a physical computer that provides a management console and other tools that are directly or remotely accessible to a system administrator or other user having the appropriate privilege(s).

The management server 142 may include one or more modules 144 that are usable for tasks that pertain to resource management, provisioning, analysis, etc. Such modules can be embodied as software programs or other code or tool, including some associated hardware. For example, one of the modules 144 can include a provisioning module for the provisioning and management of VMs. Another of the modules 144 can include a resource management module for the management of resources (e.g., hardware and software resources) in the virtualized computing environment 100. Still another of the modules 144 can include a data analysis module for the analysis of resource usage data associated with hosts and VMs. These are only a few examples of the modules 144 that can be included in the management server 142.

In one embodiment, the functionality and features of the modules 144 can be accessed by a system administrator (or other user having the appropriate privileges) through one of more APIs that are invoked during a workflow or outside of a workflow. Further details about how such APIs may be used to determine a minimal set of privileges for a workflow, as well as further details about the various other elements of the management server 142, will be provided below with respect to FIGS. 2-5.

The management server 142 may be communicatively coupled to host-A 110A . . . host-N 110N (and hence communicatively coupled to the virtual machines, hypervisors, hardware, etc.) via the physical network 112. The host-A 110A . . . host-N 110N may in turn be configured as a datacenter that is also managed by the management server 142. In some embodiments, the functionality of the management server 142 may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMN 120, using a web client 148. The user device 146 can be in the form of a computer, including desktop computers and portable computers (such as laptops and smart phones). In one embodiment, the user may be a system administrator that also uses the web client 148 of the user device 146 to remotely communicate with the management server 142 for purposes of configuring, managing, etc. the VMs and hosts. For example, the user may use the web client 148 to initiate and execute a workflow. The web client 148 may then use APIs to perform API calls to access the functionality of the modules 144 and/or other resources provided through the management server 142. In some embodiments, other tools in the user device 146 can be used, alternatively or in addition to the web client 148, to initiate and execute a workflow. For example, an application (different from the web client 148) installed in the user device 146 can be used to interact with the management server 142, including using APIs to make API calls to the management server 142.

The user device 146 may also include a user interface 150. The user interface 150 may comprise part of the web client 148 (e.g., a web-based user interface), or may be external to the web client 148 (such as a user interface that is provided by some other application installed in the user device 146 and which can communicate with the web client 148). The web client 148 of one embodiment may in turn be any suitable browser-based application that is capable to communicate with the management server 142 (or other remote device), to generate the user interface 150 (including providing workflow tools and data via the user interface 150), and to support other functionality for operating the user device 146. The features and functionality of various elements of the user device 146, in the context of determining a minimal set of privileges to execute a workflow, will be described in more detail below with respect to FIGS. 2-5.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Determination of a Minimum Set of Privileges to Execute a Workflow

Figure 2:
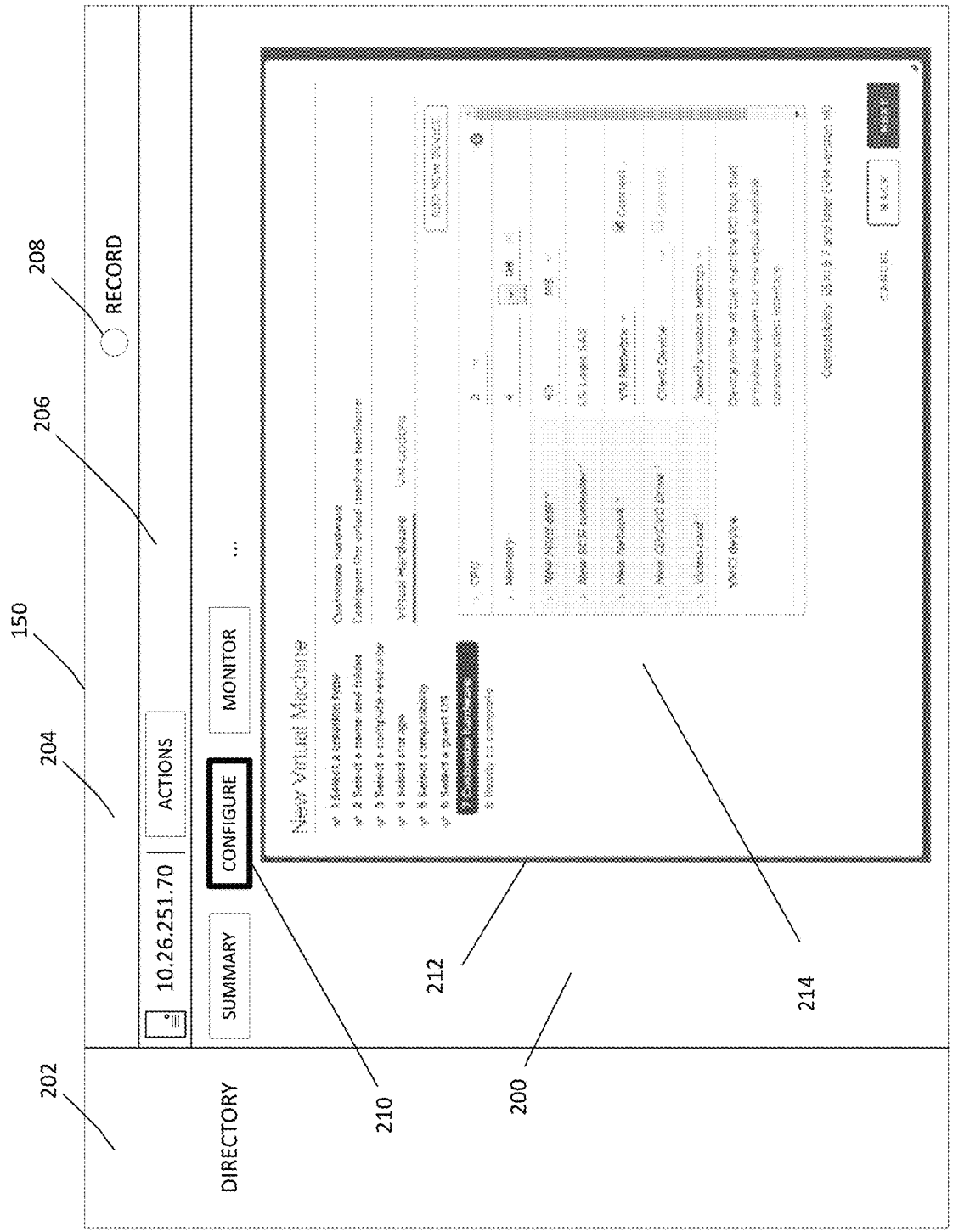
FIG. 2 is an example user interface that can be provided by a user device in FIG. 1 for execution of a workflow.

To initially provide more context as to how APIs associated with a workflow may be used to determine a minimal set of privileges for the virtualized computing environment 100 of FIG. 1, an example use scenario will be described next herein with respect to FIG. 2. Specifically, FIG. 2 is an example of the user interface 150 that can be provided by the user device 146 of FIG. 1 for execution of a workflow. The layout of the user interface 150 includes a primary window pane 200, a navigation pane 202 having a directory that lists resources, a first menu bar 204, and a second menu bar 206.

In this example use scenario, a user (such as an IT staff member) will be executing a workflow to add a new VM to a host (such as the the host-A 110A). Prior to beginning the workflow, the user first presses (such as by clicking with a mouse) a record button 208 in the first menu bar 204. Presssing the record button 208 instructs a recorder service (or other background software component) to record all subsequent interactions between the user and the user interface 150 during the course of the session to add the new VM. In one embodiment, recording the interactions includes storing or otherwise capturing/saving the code that is executed during the session.

After pressing the record button 208, the user may navigate to the navigation pane 202 to select a particular host where the new VM will be added. In this example, an IP address of the selected host is 10.26.251.70, as displayed in the second menu bar 206. The user may then perform any number of possible interactions with the user interface 150 in order to add and configure the new VM, including specifying hardware mappings and parameter values for CPUs, storage devices, NICs, etc. These user interactions may involve selecting options from pull-down menus, such as options from the ACTIONS pull-down menu in the second menu bar 206, clicking on menu selection buttons 210 in the primary window pane 200, etc. User interaction with the user interface 150 may also result in the rendering of a secondary window pane 212 that overlays the primary window pane 200. The secondary window pane 212 may have a number of fields 214 where the user can specify further configuration parameters for the new VM. Such further configuration parameters may be specified by the user via pull-down menu selections, menu button selections, text entry, etc. in the fields 214 of the secondary window pane 212.

The above various sequential interactions between the user and the user interface 150 involve the execution of code and API calls, all of which are recorded by the recorder service. Such API calls may be made to remote resources (such as API calls to the modules 144 in the management server 142) or may be made to any other resource(s) in the virtualized computing environment 100 during the course of executing the workflow. When the user has finished the workflow (e.g., after the new VM has been added), the user may click on the record button 208 again to stop the recording process.

Figure 3:
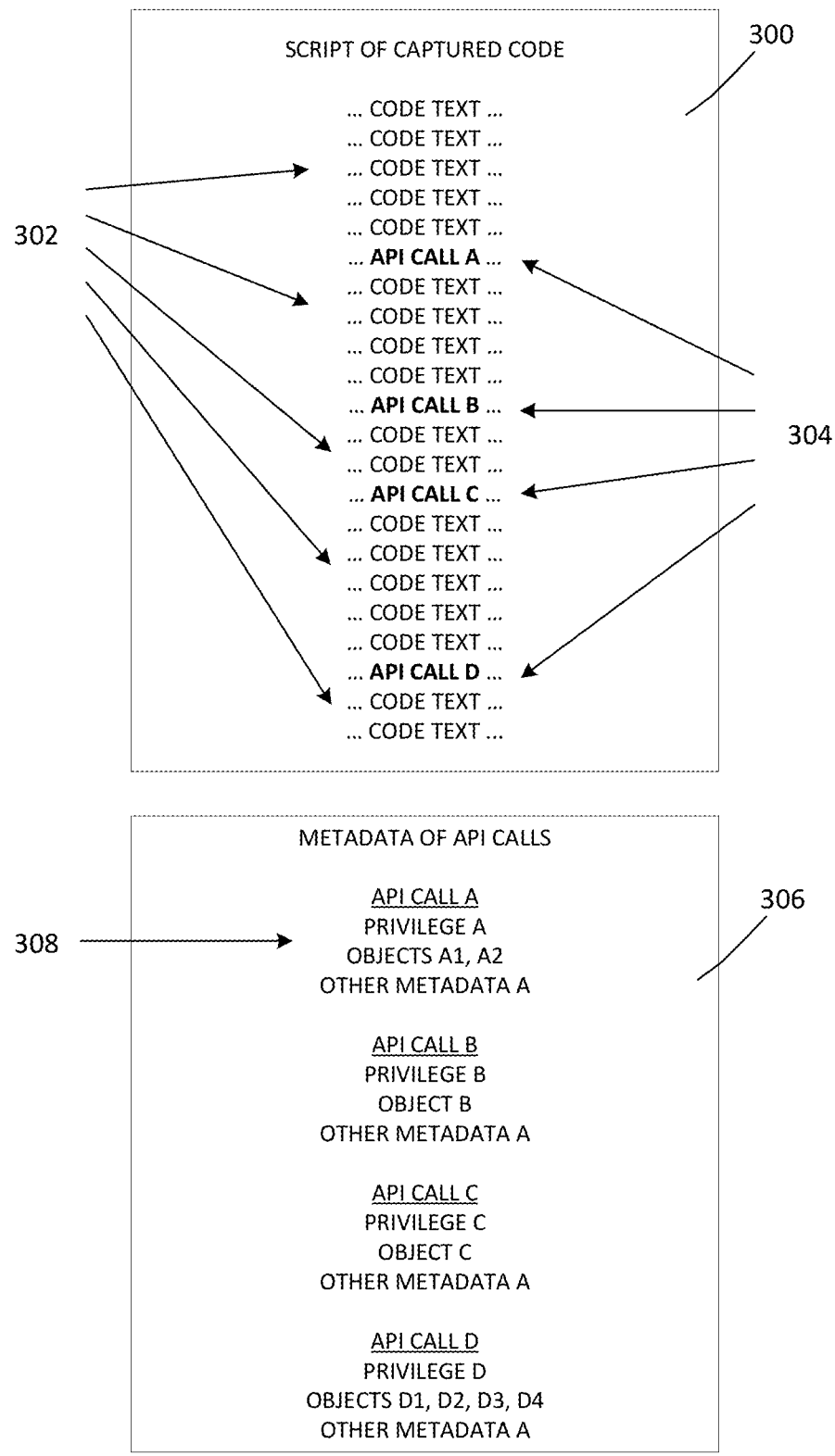
FIG. 3 is a representation of an example script and metadata that can be generated in connection with the execution of the workflow in FIG. 2.

FIG. 3 is a representation of an example a script 300 that can be generated from the recording of the executed workflow of FIG. 2. Specifically, the script 300 contains the text 302 of the code that was executed during the workflow as the user interacted with the user interface 150. In this example, the script 300 shows that there were four different API calls 304 (e.g., API calls A-D) that were made during the execution of the workflow.

FIG. 3 also shows a representation of a set of metadata 306 associated with the four API calls 304. The set of metadata 306 may be captured as part of the recording and/or may be parsed from the content of the API calls themselves and/or may be obtained from any other source that makes API metadata available. As depicted in FIG. 3, each API call has metadata 308 associated with the API call. Such metadata 308 may identify the particular privilege (e.g, Privilege A, B, C, or D) that is required to execute the API call, the object(s) that the API call is directed towards and for which the privilege is required, and other metadata associated with the API call.

Based on a combination of the captured code depicted in the script 300 (which identifies the API calls that were made) and the set of metadata 306 (which identifies the privileges that correspond to the API calls), a minimum set of privileges can be determined. In this example use scenario of FIGS. 2 and 3 (for adding a new VM to a host), a processor or other element that processes the script 300 and the set of metadata 306 can determine that the minimum set of privileges to add a new VM are Privileges A, B, C, and D (four total privileges). Then, these Privileges A, B, C, and D can be added to a model or other data structure that associates Privileges A, B, C, and D to a workflow for adding a new VM to a host. Thereafter, whenever privileges are to be assigned to some other user and the other user is expected to be performing workflows that add new VMs to hosts, the information in the model can be used to determine that Privileges A, B, C, and D should be assigned to that other user.

Figure 4:
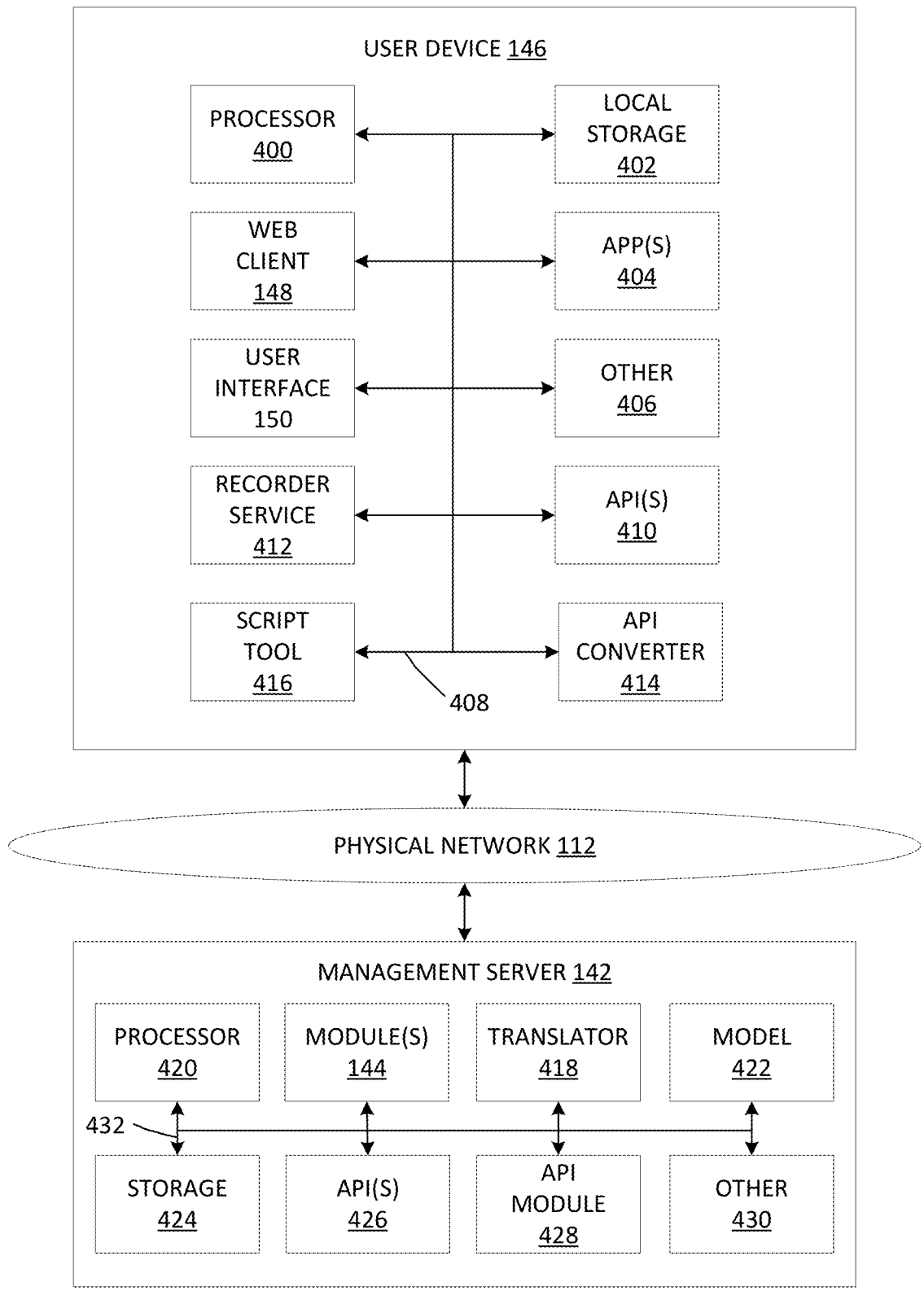
FIG. 4 is a block diagram showing further details of an example user device and management server of the virtualized computing environment of FIG. 1 that can be used for automated determination of privileges to execute a workflow.

Having now shown and described an example use scenario with respect to FIGS. 2 and 3 for determining, from API calls, a minimal set of privileges to execute a workflow, reference is now made to FIG. 4 for purposes of describing the elements of the user device 146 and the management server 142 that are operable to support the functions and features described above. Specifically, FIG. 4 is a block diagram showing further details of one embodiment of the user device 146 and the management server 142 that can be used for automated determination of privileges to execute a workflow.

In FIG. 4, various elements (used in connection with the process to determine the privileges) are shown and described as residing and operating in the user device 146 or in the management server 142. These are just some example implementations. According to various embodiments, many of the elements may predominantly reside in the user device 146 or may predominantly in the management server 142, or some of the elements may even reside in some other different locations. Furthermore, "hybrid" implementations are also possible, wherein various elements may be more distributed in terms of where they reside and operate. At least two implementations will be described later below, including an embodiment wherein the elements and operations predominantly reside at the user device 146, and another embodiment wherein the elements and operations are more distributed between the user device 146 and the management server 142.

In FIG. 4, the user device 146 can include a processor 400, a local storage device 402, one or more applications 404, the web client 148, the user interface 150, and other elements 406 (e.g., a communication interface, a user input device, a display device, other hardware or software element, resources/objects including data, etc.). All of these and other elements of the user device 146 can be physically coupled (such as by a bus) and/or logically coupled together, as represented at 408, for operation and communication with each other. A similar representation at 432 is provided in the embodiment of the management server 142 in FIG. 2. mFor the sake of brevity and unless otherwise described herein, the other elements 406 of the user device 146 are not shown and described in further detail.

The processor 400 can be any suitable CPU or controller that is operable to manage and control the operation of the various elements of the user device 146, including execution of computer-readable instructions stored on the local storage device 402. For instance, the local storage device 402 may be a non-transitory computer-readable medium (such as a memory) configured to store software or other computer-readable instruction, which in response to execution by a processor, cause the processor to perform or control performance of the operations described herein in connection with determining privileges from APIs. Furthermore, the local storage device 402 may include a cache or buffer, such as a cache that can store a recording, API calls, metadata of API calls, etc.

The user device 146 may further include one or more local APIs 410. The APIs 410 may be used, for example, to make API calls to the modules 144 that remotely reside at the management server 142, or API calls to some other elements in the virtualized computing environment 100.

Further with respect to determining privileges to execute a workflow, the user device 146 may include a recoder service 412. As explained previously above with respect to FIG. 2, the record button 208 in the user interface 150 may be actuated to start or end a recording of the code that is being executed for a workflow.

The user device 146 may further include an API converter 414. In one embodiment, the API converter 414 is configured to capture API calls (including API metadata) and to convert the API calls to a common format, such as javascript object notation (JSON) format, which is then converted to a script. For example, the script could have a form such as represented at 300 in FIG. 3. The API converter 414 may also be configured to drop (exclude) API calls that might be considered as "noise" or that are irrelevant to the interaction (such as data retrievals caused by automatic refresh). The API converter 414 may also perform obfuscation, such as obfuscation of passwords and other sensitive confidential data that may be present in the recorded interaction.

Still further, the user device 146 can include a script tool 416, such as a script viewer/editor that outputs a viewable and editable version of the script generated by the API converter 414. The script tool 416 (or the API converter 414) can provide the script (including the API calls and the API metadata) to a translator 418, which is configured to translate the script to different languages. The translator 418 is depicted in FIG. 4 as residing in the management server 142, but can reside at any suitable location.

The output of the translator 418 can be processed by a processor 420 of the management server 142 (or by the processor 400 of the user device 146) to determine the API calls that were executed and their corresponding privileges. The processor 420 can then create or update a model 422 (or some other data structure) to indicate that those privileges are required for execution of the particular workflow. The model 422 may be stored in a storage device 424 of the management server 142. Furthermore, the storage device 424 may also store software or other computer-readable instruction, which in response to execution by the processor 420, cause the processor 420 to perform or control performance of at least some operations described herein in connection with determining privileges from APIs.

An embodiment will now be described herein with reference to FIG. 4 for an implementation wherein it is predominantly the elements of the user device 146 that operate to determine privileges, from API calls, for executing a workflow. To begin the process, the user first opens the user interface 150 and activates the recorder service 412 (such as by clicking on the record button 208). Next, the user interacts with the user interface 150 during the course of performing the workflow, thereby causing the execution of code and invocation of the APIs 410 that make API calls to resources/objects.

The recorder service 412 records the code and API calls of the interactions, and feeds the recording to the API converter 414 until the recording process is stopped. The API converter 414 in turn captures the API calls (including the API metadata) from the recording and transforms the API calls to a common format (which may then be converted to a script). The API converter 414 may also cache the captured API calls in the local storage device 402.

The API converter 414 may then provide the script (including the API metatada) to the script tool 416 and/or to the translator 418 for translation into a language that can be processed by the processor 400 or processor 420 in order to identify the API calls that were made and the privileges associated with the API calls. The identified privileges can then be inserted into the model 422 for later consumption.

An embodiment will now be described herein with reference to FIG. 4 for an implementation wherein elements of both the user device 146 and the management server 142 are more distributed in terms of their operation to determine privileges, from API calls, for executing a workflow. In this embodiment, the web client 148 (during the course of executing the workflow) invokes APIs 426 that remotely reside at the management server 142 for API calls to resources (such as the modules 144) that reside at the management server 142, alternatively or in addition to invoking the APIs 410 that reside at the user device 146.

When the user begins the recording process, an API module 428 performs the recording to capture API calls associated with the APIs 426. The API module 428 may have the functionality and features of the API converter 414, such as converting the API calls (and the API metadata) to a common format and storing the captured API calls in an interceptor cache (which may reside at the storage device 424 in the management server 142). The common format may be in script form, and the API module 428 may provide the script to the script tool 416 of the user device 146 and/or to the translator 418 for translation into a language that can be processed by the processor 420 to determine the API calls and associated privileges from the script, for placement into the model 422.

The management server 142 may have other elements 430. An example is adaptation code to update the model 422. For example, the identity and number of minimal privileges to execute a particular workflow may evolve over time, due to system or process updates, due to a learning process wherein different users that execute the same workflow may use different privileges, or due to other reasons. The adaptation code can be executable to keep the information in the model up to date.

Figure 5:
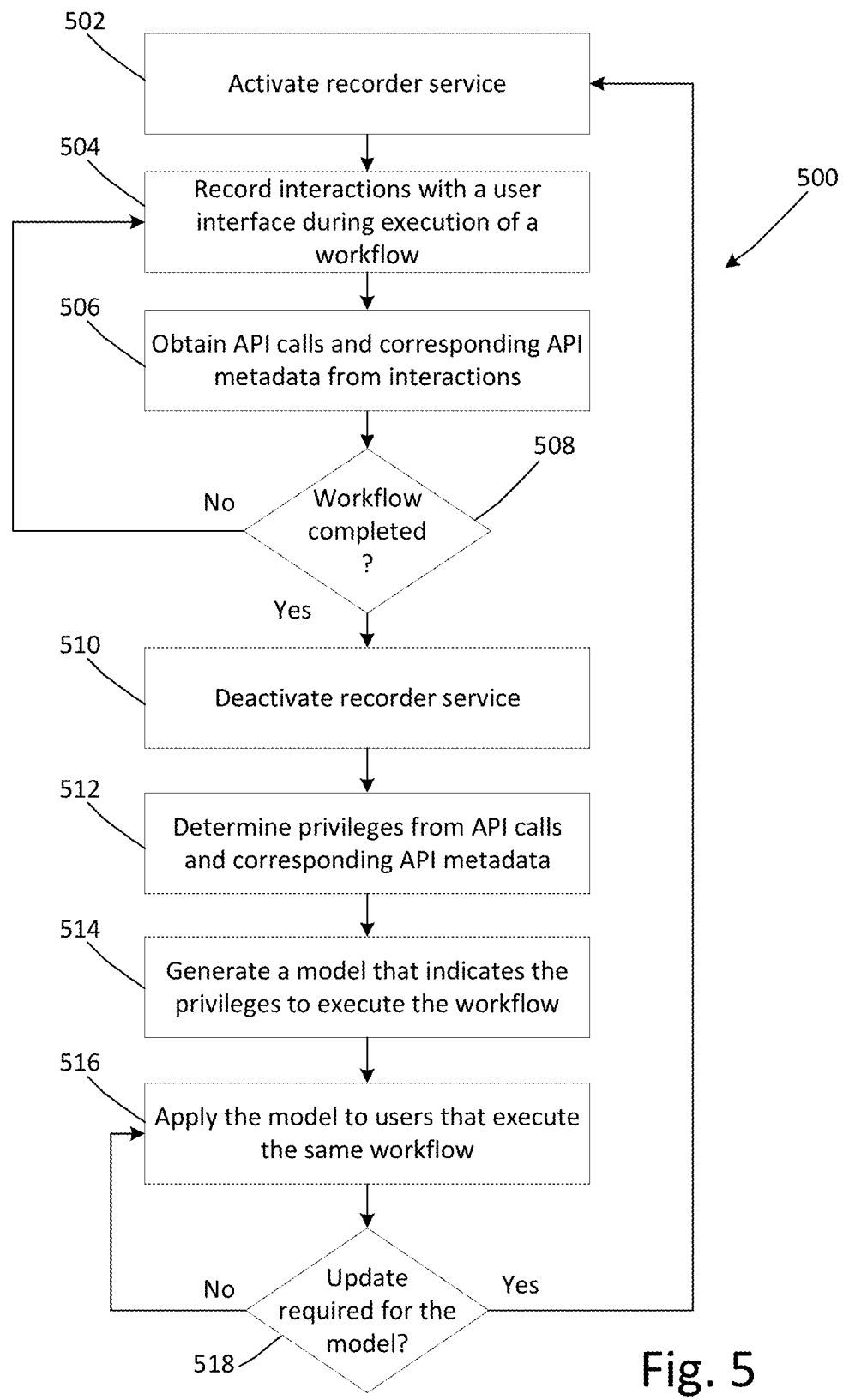
FIG. 5 is a flowchart of an example method that can be implemented in the virtualized computing environment in FIG. 1 to determine privileges to execute a workflow.

FIG. 5 is a flowchart of an example method 500 to determine a minimal set of privileges to execute a workflow. The method 500 can be implemented in the virtualized computing environment 100 in one embodiment. In another embodiment, the method 500 can be implemented in some other type of computing environment (which may not necessarily involve a virtualized computing environment), wherein it would be beneficial to determine the minimal set of privileges from API calls. The example method 500 may include one or more operations, functions, or actions illustrated by one or more blocks, such as blocks 502 to 518. The various blocks of the method 500 and/or of any other process(es) described herein may be combined into fewer blocks, divided into additional blocks, supplemented with further blocks, and/or eliminated based upon the desired implementation.

According to one embodiment, the method 500 may be performed by the user device 146. In other embodiments, the method may be performed by the management server 142, alone or in conjunction with the user device 146.

At a block 502 ("Activate recorder service"), a user wishes to begin a workflow and initiates a recording of the subsequent interactions with the user interface 150. The recorder service 412 at the user device 146 or a recorder service at the management server 142 is launched, in response to the user's activation of the record button 208.

At a block 504 ("Record interactions with a user interface during execution of a workflow"), the recorder service records the code that is executed during the course of the user's interaction with the user interface 150. The recorded code may include API calls and corresponding API metadata.

At a block 506 ("Obtain API calls and corresponding API metadata from interactions"), the API converter 414 or the API module 428 captures the API calls and corresponding API metadata. The API calls may be obtained from the recording, or may be obtained more dynamically as the APIs calls are invoked (such as by intercepting the API calls during run-time, prior to or separately from the recording that is being performed). The corresponding API metadata may be obtained from these or any other source(s).

At a block 508 ("Workflow completed?"), the API converter 414 or API module 428 (or other element) determines whether the workflow is completed. A determination that the workflow is completed may be made, for example, if the user closes out the tools that are being used to perform the workflow, if the user clicks on the record button 208 again to end the recording, or if the user provides some other indication that the session has ended. If the workflow is determined at the block 508 to not have ended, then the method returns to the block 504 to continue recording the interactions.

If the workflow is determined at the block 508 to have ended, then the method proceeds to a block 510 ("Deactivate recorder service") to end the recording. At this point, the API converter 414 or the API module 428 may convert the contents of the recorded interactions to a common format (which may then be converted into a script), and may also send the script to the translator 418 for translation into a language that is usable by the processor 420 or the processor 400.

At a block 512 ("Determine privileges from API calls and corresponding API metadata"), the processor 420 or the processor 400 examines the common format to identify the API calls that were executed, and then identifies the privileges from the API metadata of the API calls. The identified privileges are then combined to form the set of minimal privileges, or otherwise deemed to be the minimal set of privileges, to execute the particular workflow. In some embodiments, the script may be examined by the processor 420 or the processor 400 to identify the API calls. This identification may be done, for example, by parsing the script to locate character strings or other text/content that have the format of API calls.

At a block 514 ("Generate a model that indicates the privileges to execute the workflow"), the the processor 420 or the processor 400 generates (including updating) the model 422 to associate the set of privileges to the particular workflow. Thereafter at a block 516 ("Apply the model to users that execute the same workflow"), the model 422 can be applied to other users that will execute the same or similar workflow. Applying the model 422 to the other users thus avoids having to "guess" or to review documentation to determine the minimal set of privileges to assign to the other users in order to execute the workflow. Furthermore, a script that checks the privileges can be generated and can be prepended to a recorded script or otherwise added to the model. In this manner, when a user attempts to execute a workflow that corresponds to the recorded script, the workflow will fail at an early/initial stage if the checking determines that there are insufficient privileges to complete the workflow, instead of partially executing some of the operations of the workflow, which could be detrimental.

At a block 518 ("Update required for the model?"), a determination is made as to whether an update to the model 422 may be appropriate. If an update is not needed, then the same model can continue to be applied at the block 516. If an update is needed, then the method may return to the block 502 to initiate another recording process for the workflow.

At least some of the embodiments described above presume that the user is already in possession of at least some rudimentary number (e.g. a relatively small number) of privileges when the user initiates a workflow. Then, through multiple sessions and with the assistance of IT staff, the user may be granted other privileges in order to successfully complete the workflow over time. This may be viewed as an iterative learning process to build the model 422 for the particular workflow, in which privileges are being added to the model until arriving at the minimal set of required privileges.

In some other embodiments, the user may start with a relatively larger number of privileges. Then, as the user executes one or more workflows, any unused privileges can be de-assigned from the user, so as to arrive at a final set of minimal privileges to execute the work flow. This may also be viewed as an interative learning process to build the model 422 for the particular workflow, except that there is a trimming (subtraction) of privileges until arriving at the minimal set of required privileges.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 2 to FIG. 5.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to automate the determination of a minimal set of privileges to execute a workflow.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to determine a minimal set of privileges to execute a workflow in a virtualized computing environment, the method comprising:
   recording interactions with a user interface in the virtualized computing environment while executing the workflow;

capturing, from at least the recorded interactions, application program interface (API) calls that are made while executing the workflow on the user interface in the virtualized computing environment;
excluding, from the recorded interactions, API calls that are irrelevant to the workflow, wherein the excluded API calls include an API call involving a data retrieval caused by a refresh;
identifying privileges that correspond to the captured API calls; and
combining the identified privileges to form the minimal set of privileges.

2. The method of claim 1, wherein capturing the API calls includes identifying the API calls from a common format that is generated by recording the interactions with the user interface while executing the workflow, and wherein identifying the privileges includes identifying the privileges from API metadata that corresponds to the captured API calls.

3. The method of claim 1, further comprising:
generating a model that associates the minimal set of privileges to the workflow; and
applying the model to a user to determine privileges to assign to the user to perform a same workflow.

4. The method of claim 3, further comprising updating the model.

5. The method of claim 1, wherein the workflow pertains to management of elements in the virtualized computing environment.

6. The method of claim 1, wherein recording the interactions includes recording code that is executed while interacting with the user interface during the workflow, wherein the recorded code includes the API calls, and wherein the method further comprises:
obfuscating confidential data that is present in the recorded code;
converting the recorded code into a script; and
translating the script into a language usable by a processor to identify the API calls and the privileges.

7. The method of claim 1, wherein capturing the API calls further includes intercepting at least some of the API calls during run-time, separately from the recorded interactions.

8. A non-transitory computer-readable medium having instructions stored thereon, which in response to execution by one or more processors, cause the one or more processors to perform or control performance of operations to determine a minimal set of privileges to execute a workflow in a virtualized computing environment, the operations comprising:
recording interactions with a user interface in the virtualized computing environment while executing the workflow;
capturing, from at least the recorded interactions, application program interface (API) calls that are made while executing the workflow on the user interface in the virtualized computing environment;
excluding, from the recorded interactions, API calls that are irrelevant to the workflow, wherein the excluded API calls include an API call involving a data retrieval caused by a refresh;
identifying privileges that correspond to the captured API calls; and
combining the identified privileges to form the minimal set of privileges.

9. The non-transitory computer-readable medium of claim 8, wherein capturing the API calls includes identifying the API calls from a common format that is generated by recording the interactions with the user interface while executing the workflow, and wherein identifying the privileges includes identifying the privileges from API metadata that corresponds to the captured API calls.

10. The non-transitory computer-readable medium of claim 8, wherein the operations further comprise:
generating a model that associates the minimal set of privileges to the workflow; and
applying the model to a user to determine privileges to assign to the user to perform a same workflow.

11. The non-transitory computer-readable medium of claim 10, wherein the operations further comprise:
updating the model.

12. The non-transitory computer-readable medium of claim 8, wherein the workflow pertains to management of elements in the virtualized computing environment.

13. The non-transitory computer-readable medium of claim 8, wherein recording the interactions includes recording code that is executed while interacting with the user interface during the workflow, wherein the recorded code includes the API calls, and wherein the operations further comprise:
obfuscating confidential data that is present in the recorded code;
converting the recorded code into a script; and
translating the script into a language usable by a processor to identify the API calls and the privileges.

14. The non-transitory computer-readable medium of claim 8, wherein capturing the API calls further includes intercepting at least some of the API calls during run-time, separately from the recorded interactions.

15. An apparatus to determine a minimal set of privileges to execute a workflow in a virtualized computing environment, the apparatus comprising:
a display screen configured to present a user interface in the virtualized computing environment;
a recorder service configured to record interactions with the user interface while executing the workflow;
an application program interface (API) converter configured to capture, from at least the recorded interactions, API calls that are made while executing the workflow on the user interface, wherein the API converter is further configured to exclude, from the recorded interactions, API calls that are irrelevant to the workflow, wherein the excluded API calls include an API call involving a data retrieval caused by a refresh; and
a processor coupled to the API converter and configured to:
identify privileges that correspond to the captured API calls; and
combine the identified privileges to form the minimal set of privileges.

16. The apparatus of claim 15, wherein:
to capture the API calls, the API converter is configured to identify the API calls from a common format that is generated from the recorded interactions with the user interface while executing the workflow, and
to identify the privileges, the processor is configured to identify the privileges from API metadata that corresponds to the captured API calls.

17. The apparatus of claim 15, wherein the processor is further configured to:
generate a model that associates the minimal set of privileges to the workflow; and
apply the model to a user to determine privileges to assign to the user to perform a same workflow.

18. The apparatus of claim 17, wherein processor is further configured to update the model.

19. The apparatus of claim 15, wherein the workflow pertains to management of elements in the virtualized computing environment.

20. The apparatus of claim 15, wherein to record the interactions, the recorder service is configured to record code that is executed while interacting with the user interface during the workflow, wherein the recorded code includes the API calls, wherein the API converter is further configured to:
   obfuscate confidential data that is present in the recorded code; and
   convert the recorded code into a script, and
wherein the apparatus further comprises a translator configured to translate the script into a language usable by a processor to identify the API calls and the privileges.

21. The apparatus of claim 15, wherein to capture the API calls, the API converter is further configured to intercept at least some of the API calls during run-time, separately from the recorded interactions.

* * * * *